(12) United States Patent  
Yungner et al.

(10) Patent No.: US 7,749,380 B2  
(45) Date of Patent: Jul. 6, 2010

(54) INTEGRATED MOBILE RESOURCE SYSTEM

(75) Inventors: Deborah Yungner, Chanhassen, MN (US); Frank G. Mendez, Chanhassen, MN (US); David J. Peterson, Rogers, MN (US)

(73) Assignee: Erbus, Inc., Edina, MN (US)

( * ) Notice: Subject to any disclaimer, the term of this patent is extended or adjusted under 35 U.S.C. 154(b) by 720 days.

(21) Appl. No.: 10/582,153

(22) PCT Filed: Dec. 8, 2004

(86) PCT No.: PCT/US2004/041123

§ 371 (c)(1),
(2), (4) Date: May 16, 2007

(87) PCT Pub. No.: WO2005/057422

PCT Pub. Date: Jun. 23, 2005

(65) Prior Publication Data

US 2007/0210236 A1    Sep. 13, 2007

Related U.S. Application Data

(60) Provisional application No. 60/527,916, filed on Dec. 8, 2003, provisional application No. 60/528,089, filed on Dec. 9, 2003, provisional application No. 60/604,288, filed on Aug. 24, 2004.

(51) Int. Cl.
*B01D 35/02* (2006.01)

(52) U.S. Cl. .......... 210/143; 55/315; 55/315.1; 55/356; 96/223; 96/417; 210/192; 210/241; 210/259; 135/88.13; 135/91; 135/93; 52/79.1; 52/143

(58) Field of Classification Search .............. 55/315, 55/318, 356, 385.1, 385.2, 385.6, 315.1; 96/397, 223, 417; 210/85, 143, 182, 192, 210/202, 241, 259; 135/88.13, 91, 93, 95, 135/96, 97, 121; 52/63, 79.1, 143
See application file for complete search history.

(56) References Cited

U.S. PATENT DOCUMENTS

| | | | |
|---|---|---|---|
| 2,789,234 A | | 4/1957 | Lambert et al. |
| 3,964,458 A | | 6/1976 | Strauss et al. |
| 5,399,260 A | * | 3/1995 | Eldredge et al. ............ 210/87 |
| 5,547,584 A | * | 8/1996 | Capehart .................. 210/669 |
| 5,706,846 A | * | 1/1998 | Sutton ..................... 135/128 |

(Continued)

FOREIGN PATENT DOCUMENTS

FR     2 589 784     5/1987

*Primary Examiner*—Joseph W Drodge
(74) *Attorney, Agent, or Firm*—Patterson Thuente Christensen Pedersen, P.A (57) ABSTRACT

An integrated and modular infrastructure resource system (IRS) is herein described. The IRS includes one or more infrastructure modules adapted to fulfill a given infrastructure needs such as electrical power, communications, water purification, and air filtration. The IRS may be controlled locally by a control module coupled to the infrastructure modules by a power bus and a control bus or remotely by a remote control panel that communicates with the IRS by means of a communications module that includes a two-way communications device. The power bus and control bus act to network all of the provided infrastructure modules into an integrated system. Maintenance and logistics for a plurality of IRS's may be managed remotely by a single remote control panel.

34 Claims, 10 Drawing Sheets

U.S. PATENT DOCUMENTS

| | | | |
|---|---|---|---|
| 5,747,734 A * | 5/1998 | Kozlowski et al. | 174/50 |
| 5,997,750 A * | 12/1999 | Rozelle et al. | 210/744 |
| 6,390,110 B1 * | 5/2002 | Brown | 135/93 |
| 6,393,775 B1 | 5/2002 | Staschik | |
| 6,609,070 B1 * | 8/2003 | Lueck | 702/50 |
| 7,230,819 B2 | 6/2007 | Muchow et al. | |
| 2002/0189173 A1 * | 12/2002 | Staschik | 52/79.1 |
| 2003/0220717 A1 * | 11/2003 | Underwood et al. | 700/282 |
| 2004/0262206 A1 * | 12/2004 | Gettman | 210/143 |

* cited by examiner

INTEGRATED MOBILE RESOURCE SYSTEM

RELATED APPLICATIONS

This application claims priority to the U.S. provisional patent application Nos. 60/527,916; 60/528,089; and 60/604,288 filed on Dec. 8, 2003, Dec. 9, 2003, and Aug. 24, 2004, respectively. These patent applications are hereby incorporated by reference in their entirety.

TECHNICAL FIELD OF THE INVENTION

The present invention relates to a modular and mobile utility infrastructure or utility device and a method for providing infrastructure services.

BACKGROUND OF THE INVENTION

In emergency, military, or humanitarian aid situations where infrastructure services such as power, communications, and water are not available or are not reliable, it is common to procure and install disparate, independent systems to provide such services. Similarly, where there exist no infrastructure services to speak of, multiple devices must be procured and installed to provide such services. Problems arise, however, where infrastructure services are needed on short notice or where limited funds allow only for some infrastructure services, but not others.

Accordingly, there is a need for an integrated, flexible, modular, scaleable, and mobile utility system that allows for the immediate provision of infrastructure services such as potable water, electric power, conditioned and/or environmentally controlled and filter air, and communications.

BRIEF SUMMARY OF THE INVENTION

The foregoing needs are met in an integrated and mobile infrastructure resource system that includes a power bus and a control bus that connect a plurality of distinct infrastructure modules to one another. A control module may cooperatively control the infrastructure modules locally. Alternatively, a remote control panel may cooperatively control the infrastructure modules of one or more infrastructure resource systems from a remote location via a two-way communications link provided by one of the infrastructure modules.

These and other objects, aspects, features and advantages of the present invention will become more fully apparent upon careful consideration of the following Detailed Description of the Invention and the accompanying Drawings, which may be disproportionate for ease of understanding, wherein like structure and steps are referenced generally by corresponding numerals and indicators. The invention further provides methods and apparatus of varying scope.

DETAILED DESCRIPTION

In the following detailed description of the invention, reference is made to the accompanying drawings that form a part hereof and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. The following detailed description is, therefore, not to be taken in a limiting sense, and the scope of the present invention is defined only by the appended claims and equivalents thereof.

An integrated resource system (IRS) according to the present invention is a modular, scaleable, integrated, and mobile utility system that provides immediate availability of resources such as potable water, electric power, environmentally controlled filtered air, and communications. Embodiments of the integrated resource system offer multiple resource modules packaged in one unit such that the integrated resource system can be adapted for use as a back up and/or in emergency response situations. Each of the IRS's modules is controlled and monitored using novel power and control buses that are adapted for use with a control module.

Figure 1:
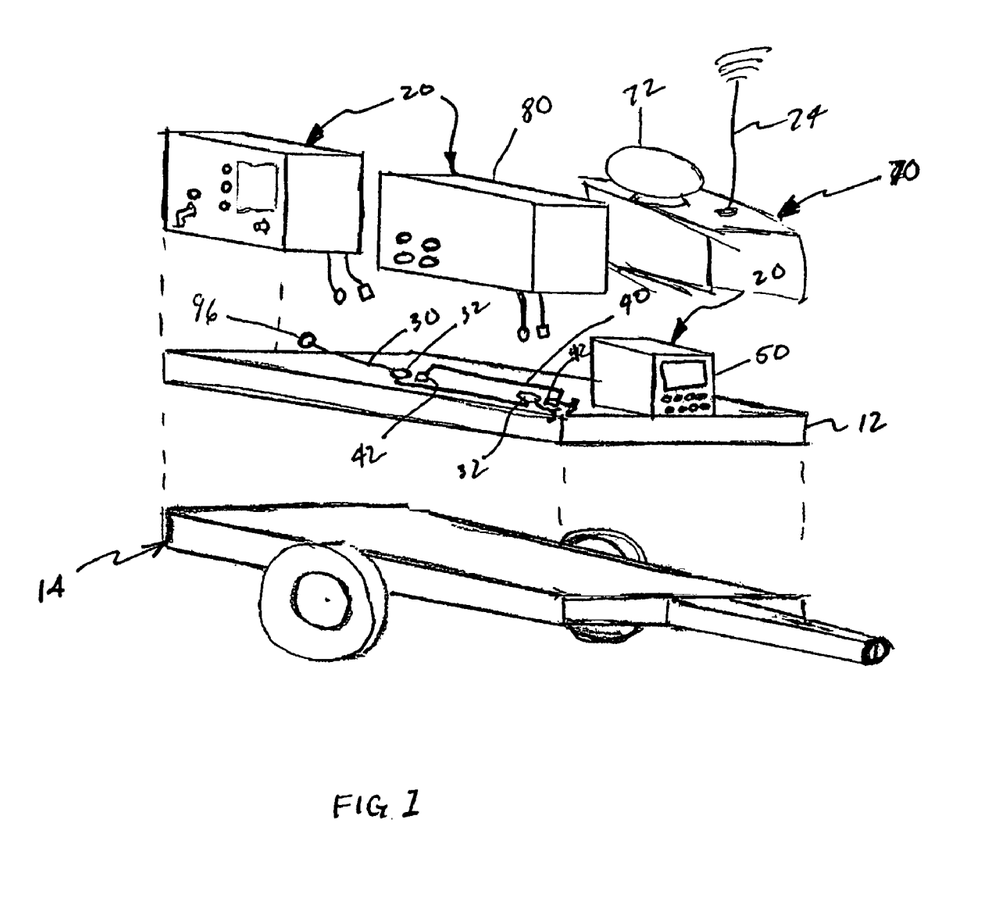
FIG. 1 is a perspective view of one embodiment of an integrated resource system of the present invention.

FIG. 1 illustrates in a schematic fashion one embodiment of an integrated resource system 10. The integrated resource system 10 includes a pallet 12 upon which are mounted the modules 20. As used herein, the reference numeral 20 will refer to the modules generally. Other reference numerals will be used to indicate specific modules of the IRS. The pallet 12 may exist as a separate structure, as shown in FIG. 1, or may be integrated as part of another structure such as the trailer 14. As the intended use of the integrated resource system 10 and the size and nature of the modules 20 may vary widely, in other embodiments the pallet 12 may be secured to, or form part of, trucks, trailers, skids, railway cars, dollies, carts, or backpacks, for example. In one embodiment, the pallet 12 may define a three-dimensional space therein in which is housed a tank or bladder to fuel that is used to power a motor associated with a generator set. The pallet 12 may also incorporate an enclosure that protects all of the modules 20 mounted thereon. In addition to the modules 20, the enclosure may also define one or more storage areas (not shown) for stowing maintenance equipment, spare parts, and other consumable materials.

In one embodiment, the integrated resource system 10 is a modular device, adapted to quickly mount or dismount unitized modules 20 thereon to meet changing needs and to effect efficient maintenance on the modules 20. In another embodiment, the modules 20 may be incorporated directly into a unitary pallet structure (not shown). Where the integrated resource system 10 is adapted as a modular device, the pallet 12 may be provided with racking (not shown) that will allow modules 20 to be stacked, the one above the other.

Figure 9:
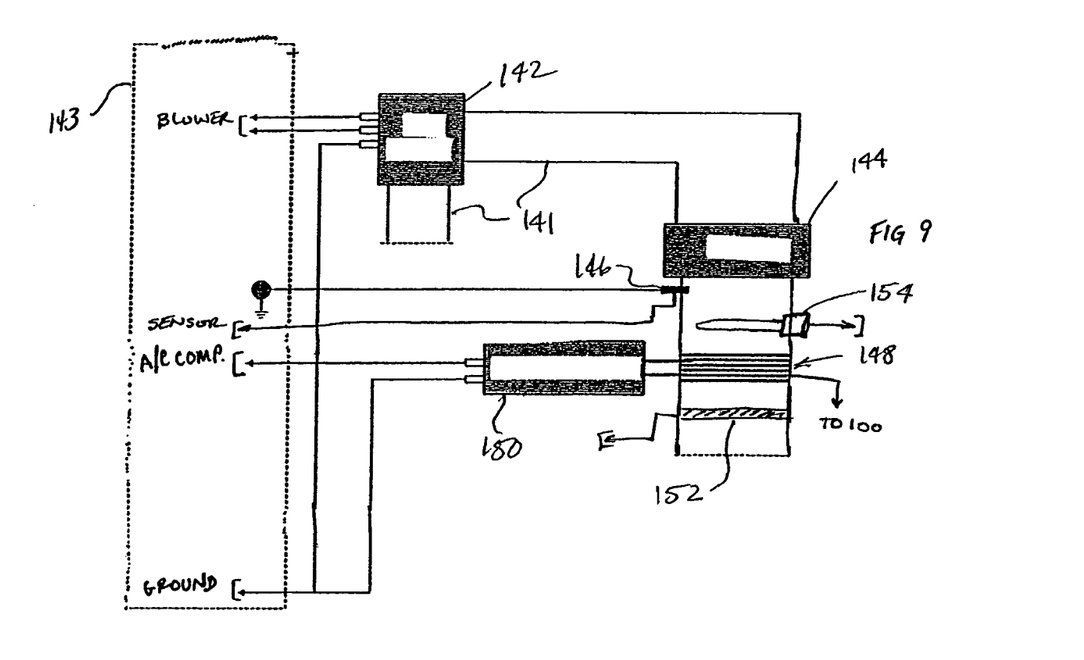
FIG. 9 is a schematic view of an air filtration module of an integrated resource system.

In one embodiment, the structure includes a housing that can have a lockable storage compartment for ancillary items which may include tools, chords, hoses, pumps, blowers, first aid, (defibrillator/medical equipment/supplies), cargo net, manuals, MSDS, warranty kits, spare parts, etc. It can also include an alarm security system and a megaphone/PA system. The housing can provide protection from the elements for all components. It can also act to insulate the sounds of the power generation unit and to properly circulate cooling air over internal system components. FIG. 9 is a schematic of the trailer module, according to one embodiment of the present invention.

In one embodiment, the modules 20 are of uniform size and shape and may be exchanged, the one for the other, without need to shift other modules 20 or modify the pallet 12. However, in other embodiments, each module 20 may have a size and shape that is different than that of the remaining modules. In these latter embodiments, it may be necessary to adapt the pallet 12 to accommodate the respective modules 20 such that a particular type of module 20 will have allocated a particular pallet location based upon its size and/or shape. In some embodiments, it may be the case that modules 20 of a given type are similar in size and shape, though this size and/or shape may differ from that of modules 20 of another type.

Returning to the embodiment illustrated in FIG. 1, the modules 20 are adapted for mounting on the pallet 12. Bolts, straps, chains, toggles, skids, harnesses, quick release fasteners, or the like are used to secure the modules 20 to the pallet 12. It should be understood that other structures might also be adapted to secure the modules 20 to the pallet 12 and to facilitate easy access and mounting of the same to the pallet 12.

In general, the modules 20 are modular, self-contained, and operate without recourse to the structures of other modules. In some embodiments however, some modules 20 may incorporate sub-modules that may be incorporated into a module 20 to provide additional functionality. In other embodiments, some modules 20 may be adapted to couple one or more respective modules 20 together so as to operate the modules 20 in conjunction with one another or to enable a function of a module 20. In some other embodiments, certain portions of a module 20 may be distributed between other modules 20.

A power bus 30 is provided to supply electric power to the modules 20 of the integrated resource system 10. The power bus 30 includes a number of connectors or couplings 32 for coupling the modules 20 thereto. In one embodiment, the power bus 30 is a simple conductor having a number of connectors 32 secured thereto. In other embodiments, the power bus 30 incorporates transformers, filters, and fuses (not shown) and may provide electrical power at a number of commonly used voltage and current levels such as 240 VAC, 110 VAC, and 12 VDC. In another embodiment, the power bus 30 is distinct structure that exists separate from the pallet 12 and modules 20. In other embodiments, the power bus 30 may be adapted as part of the pallet 12. In yet other embodiments, the power bus 30 may have certain components thereof integrated into the modules 20 themselves.

A control bus 40 is provided to control the modules 20 of the integrated resource system. Similar to the power bus 30 described above, the control bus 40 includes a number of connectors or couplings 42 for connecting the bus 40 to the modules 20. In one embodiment, the control bus 40 is a distinct structure that is deployed on the pallet 12 in such a manner as to allow easy access and maintenance. The couplings 42 of the control bus 40 are in some embodiments of a uniform configuration. In other embodiments, the couplings 42 are adapted for connection to the respective modules 20. In yet other embodiments, the control bus 42 may be a distributed structure wherein certain portions thereof are incorporated directly into certain of the modules 20. The control bus 40 is in one embodiment a series of conductors such as a flexible flat cable or a number of individual conductors, each having an appropriate coupling 42 affixed to an end thereof. The control bus 40 may in some instances also include actuators, programmable logic controllers, sensors, switches, and the like. The control bus 40 provides a mechanism for sending and receiving control signals to, from, and among the various modules 20.

A control module 50 is provided to monitor, control, and integrate the modules 20. The control module 50 facilitates sensing, measurement, monitoring, diagnosing, actuation, and control of a variety of modules 20 included in an integrated resource system 10. In one embodiment, the control module 50 may include a number of analog control and monitoring elements such as coaxial push/pull actuators, on/off toggle switches, meters, and potentiometers. Another embodiment of the control module 50 includes a combination of software, related digital and mechanical devices and data conduits that change and monitor the operational status of a module or modules 20. Software running on the control module 50 transmits and receives control signals and operational information to and from control interface modules embedded in other modules 20 of the integrated resource system 10.

Figure 2:
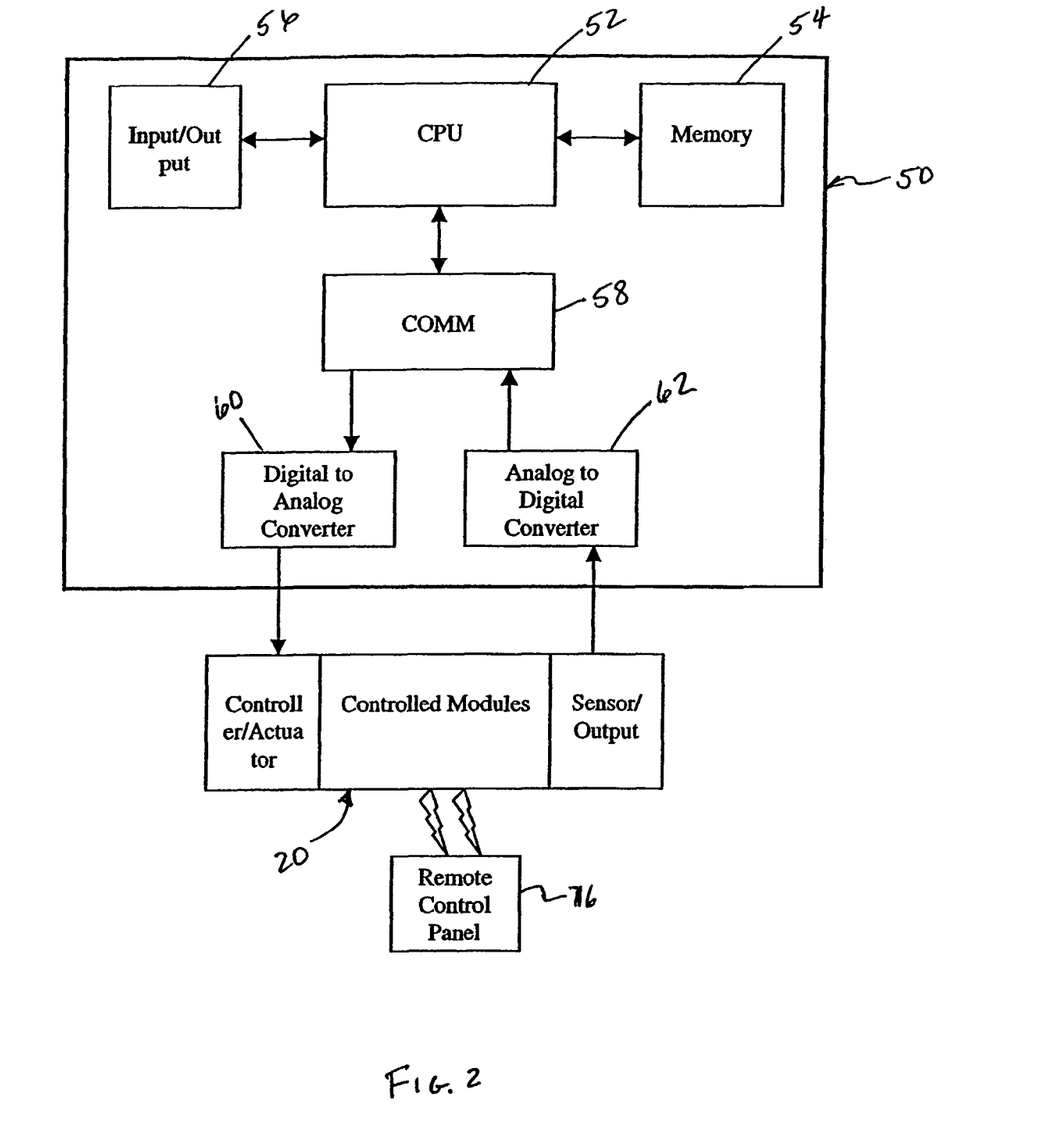
FIG. 2 is a schematic diagram of one embodiment of a control module of the integrated resource system coupled to a controlled module.

FIG. 2 illustrates another embodiment of a control module 50 that incorporates a central processing unit (CPU) 52. The CPU 52 is operatively connected to a read/write memory device 54, an input/output device 56, and a communications port 58. The CPU 52 and memory device 54 cooperate to implement control software, methods, and algorithms recorded on the memory device 54 in a manner known to those skilled in the art. The input/output device 56 of one embodiment includes a keyboard and a screen (not shown) for reading and inputting information from and to the control module 50. Note that the input/output device 56 may be formed integral with the control module 50 or may be located remote from the control module 50 and connected thereto in a known manner as by a cable or a wireless connection. The control module 50 also includes one or more analog to digital/digital to analog signal converters 60 and 62, respectively, for coding and decoding control signals heading to and coming from the CPU 52 of the control module 50. The signal converters 60 and 62 are coupled to the communications port 58. The control module 50 is adapted to allow the control bus 40 to be coupled to the signal converters 60 and 62 such that signals from the CPU 52 for controlling a module 20 may be transmitted thereto. In one embodiment, the communications port 58 and CPU 52 cooperate to control a switching means incorporated therein that appropriately addresses control signals from the CPU, through a signal converter 60 and along the control bus 40 to the appropriate module 20. Note that the signals from the control module 50 may directly control the modules 20 by means of a control interface device adapted to receive and act upon the signals from the control module 50.

In one embodiment, a control interface device is a small control panel that in some instances includes a central processing unit and memory device similar to that of the control module 50. In another embodiment, a control interface device may include or be coupled to mechanical actuators that are adapted to control the module 20 to which they are coupled.

The control module 50 not only acts as a central control hub for the modules of the integrated resource system 10, but may also control the power and control buses 30 and 40 to connect the respective modules 20 of the integrated resource system 10 directly to one another. In some instances, signals emanating from a given module 20 may be transmitted directly to another module for the purpose of controlling or optimizing the operation of that module. In some other embodiments, a single control module 50 may control multiple integrated resource systems where the systems' control buses have been coupled to provide a conduit for control and sensor signals. It is to be understood that a control module 50 may be adapted to control any combination or number of modules 20 and separate integrated resource systems, limited only by the processing power and bandwidth needed to carry out the control functions.

In some embodiments, the control module 50 will have a weather tight enclosure. In other embodiments, particularly where the integrated resource system 10 is intended for use by the military or by emergency response agencies, the enclosure of the control module may also be dust proof and even hardened to withstand electromagnetic pulses (EMP). The enclosure of the control module 50 may have any useful size and shape and further includes the necessary couplings and attachment points to secure the control module 50 to a pallet 12 and to couple the module to the control and power buses 30 and 40.

In one embodiment of the integrated resource system 10 a communications module 70 works in conjunction with the control module 50 to operate and maintain the integrated resource system 10. In one embodiment, the communications module 70 is coupled to the control module 50 by the control bus 40. In another embodiment, the communication module 70 and control module 50 may be combined in part or in toto.

The communication module 70 provides for two-way transfer of data between two or more sources. Many different types of communication media may be handled by the communications module 70, including voice, video, digital and analog data, and internet services. Communications mechanisms that may be used in the communications module 70 may include, among other technologies, satellite communications equipment, line of sight communication equipment, directional and non-directional broadcast equipment, digital communication equipment, small networks of wired telephone receivers, cellular and/or paging communication equipment, and the like. In one embodiment, the communications module 70 may include a rack-mounting architecture that allows multiple components to be readily integrated into a single module. In the embodiment illustrated in FIG. 1, the communications module 70 includes a self-orienting satellite transmission and reception unit 72 and a standard radio frequency antenna 74. Not only can the communications module 70 facilitate communications between the users of the integrated resource system 10 and others both near and far to the integrated resource system, but also provides a means for controlling the integrated resource system 10 from a remote location. For example, a remote control panel 76 (FIG. 2) may transmit signals to and receive signals from, the integrated resource system 10. In this manner, the remote control panel 76 may reflect current operational status of one or more integrated resource system 10 and may control the integrated resource system 10 from the location of the remote control panel 76. In some embodiments, a control module 50 is omitted from the integrated resource system 10 in favor of a remote control panel 76. In this embodiment, the remote control panel 76 handles all control functions remotely. In another embodiment, the communication module 70 may be adapted to provide video and audio conferencing and provide the means required to transmit and interact with audio/visual aids that accompany the conference. Multiple communications sites may be networked or conferenced to proved instantaneous, two-way communications between multiple parties at a single time.

Integrating various modules such as the communications module 70 and the control module 50 into a unitary device wherein all of the modules work cooperatively is one goal of the present invention. In one embodiment, control of the respective modules of the integrated resource system 10 is distributed among the various modules coupled by the control bus 40. In this embodiment, each module 20 operates in a predetermined manner with respect to the other modules, though where a particular module 20 is damaged, non-functional, or otherwise missing, the remaining modules 20 may be required to fall back to an individual, non-integrated mode of operation. In another embodiment, the communications module 70 is used by the remote control panel 76 to control the integrated resource system 10 and its modules 20 from a remote location. All control, maintenance, and monitoring functions may be carried out remotely without need for a separate control module.

In another embodiment, the control module 50 acts to coordinate the various modules 20 that may be incorporated into an integrated resource system 10. Modules 20 may be added to, or dropped from, the network that includes the control bus 40 and the control module 50 in a rapid manner by providing the control module 50 with a database of control templates or drivers for each module 20 that may be used in the integrated resource system 10. These drivers or templates may be updated automatically by means of the communications module 70 and remote control panel 76. Note that the structures and functions of the control module 50 are duplicated in the remote control panel 76 and accordingly, those functions described as being carried out by the control module 50 may also be carried out by the remote control panel 76 in seamless manner.

The control module 50 may also be adapted to regularly poll the control bus 40 to identify and integrate recently added modules to the integrated resource system network or to acknowledge the removal of modules 20 therefrom. When a new module 20 is detected, the control module 50 will typically query the added module 20 to determine its operational status and to ensure that the control template stored in the memory device 54 of the control module 50 is current. The results of the status query made by the control module 50 may be relayed by the communications module 70 to the remote control panel 76 as well. In a preferred embodiment, modules 20 may be added to or removed from the network defined by the control bus 40 and the control module 50 without needing to power down the integrated resource system 10, reboot the control module 50, or otherwise interrupt the operation thereof.

As electrical power is generally needed in those areas where an integrated resource system 10 is deployed, some embodiments of the integrated resource system include a power module 80. The bulk of the electric power produced by the power module 80 will be conveniently available for local area consumption to power emergency equipment, lighting, and other desired electrical devices, including providing power to a given or existing infrastructure in which power has failed, i.e. elevators, subway stations, pumps, schools and the like.

The power module 80 provides electricity to power other modules 20 in the integrated resource system and other external equipment and tools. This module consists of an electric generator 82 that may be powered by fossil fuels, wind, solar, water, and fuel cells. In one embodiment, the generator 82 is an engine-powered generator set configured with automatic electronic system controls to produce electrical power at a quality level consistent with that provided by an electrical utility. The management of the electrical power produced by the generator 82 will be connected to and/or disconnected from the power bus 30 means of automatic transfer switches or switchgear (not shown) that may be incorporated directly into the power module 80 itself or included as part of the power bus 30. The switchgear will work in conjunction with the power bus 30 and control module 50 to ensure proper management of various sources of electrical power.

Figure 7:
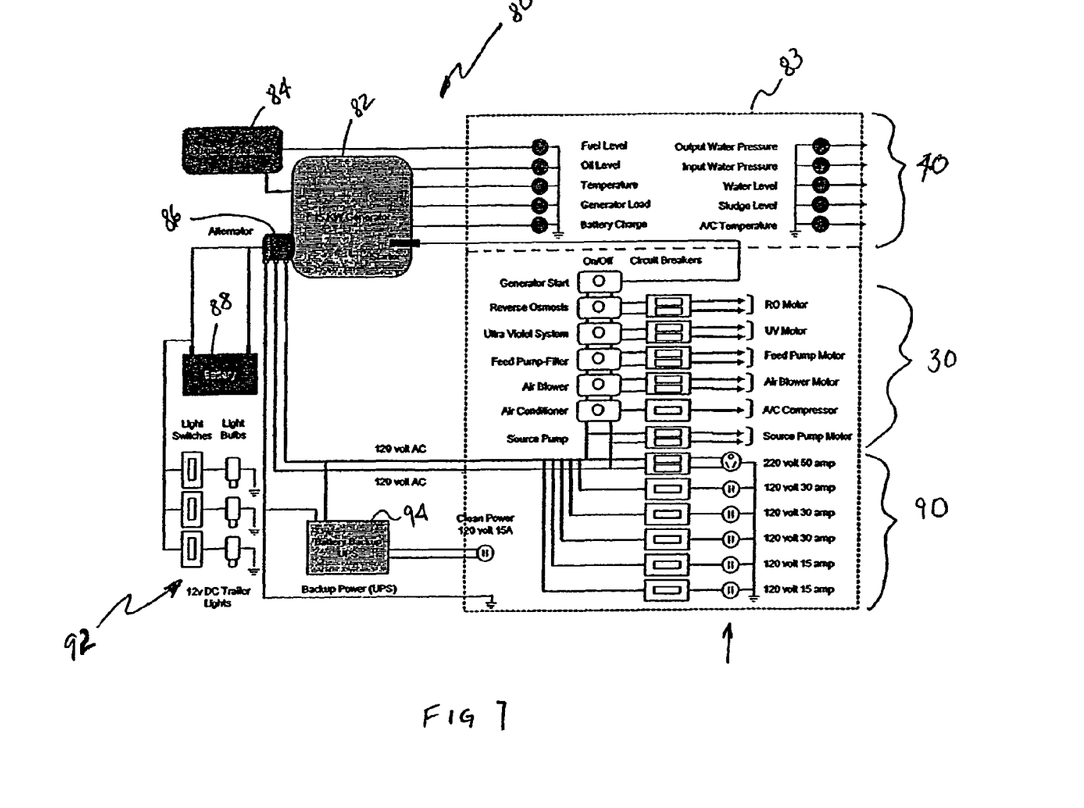
FIG. 7 is a schematic view of one embodiment of a power module of an integrated resource system.

As described above, one embodiment of the power module 80 includes a power generating and/or supply device such as a generator and/or a battery. Turning to FIG. 7, one embodiment of the power module 80 includes a generator 82 having an output of between about 15 KVA and 60 KVA and a fuel tank 84 for providing fuel to the motor of the generator 82. An alternator 86 is coupled to the motor of the generator 82 and to a battery 88 that provides power to the alternator 86 to start the motor of the generator 82. The generator 82 provides power to outlets 90 of 110V and/or 240V, to lights 92, to a storage battery 94 (if provided), and to the power bus 30. Modules 20 coupled to the power bus 30 may draw power therefrom that is provided by the power module 80. Where appropriate, transformers, signal conditioners, and/or filters will be interposed between the output of the generator 82 and the other components of the power module 82 and power bus 30 to prevent voltage surges and spikes from damaging or otherwise interrupting the operation of the other modules 20. Connections to power and control buses 30 and 40 are made at block 83.

The power module 80 may also derive power from generation devices other than a standard internal combustion engine generator. In one embodiment, a fuel cell (not shown) and its appurtenant structures may be incorporated into the power module 80. In another embodiment, one or more solar panels (not shown) may be deployed on the integrated resource system to supply power through the power module 80. In yet another embodiment, a wind-powered generator (not shown) may supply power through the power module 80. In other embodiments, the power module may be an array of batteries 94 intended to provide power only on a back up basis. Where electrical power is available from other sources such as a stand-alone generator, coupling 96 on power bus 30 may be coupled to that power source. What is more, coupling 96 may be used to couple multiple integrated resource systems 10 to provide additional power to modules 20 on a given integrated resource system in the coupled network.

Where multiple integrated resource systems 10 are coupled to one another by their power and control buses 30 and 40, the one or more control modules 50 or remote control panels 76 operating the integrated resource system may cycle the modules 20 in and out of operation in order to make efficient use of resources and to limit wear on the modules 20. For example, where two integrated resource systems 10 are coupled to one another, one of the control modules 50 will act as the primary controller for the coupled (networked) integrated resource systems and the remaining control module 50 will act as a backup controller. The controllers will periodically switch their primary and backup roles to limit the number of operation hours on the respective control modules 50. The control modules 50 may also cycle the respective modules in this same manner such as where multiple power modules 80 are cycled to limit operation hours.

A water module 100 is provided to purify and disinfect water from available sources to make it fit for human consumption or in some cases to render wastewater safe for disposal to the environment. In one embodiment, reverse osmosis filtration (RO) forms the foundation of the water purification process carried out by the water module 100, though it is to be understood that a variety of purification and disinfecting media or methods can be adapted to the use of the water module 100 in handling most water impurities. The water module 100 is adapted to interact with the control module 50 or remote control panel 76 such that the control module 50 will output a warning and/or execute preprogrammed action plans when consumables such as filter media and the like are at or near the end of their useful lives, thereby requiring repair or replacement.

Figure 8:
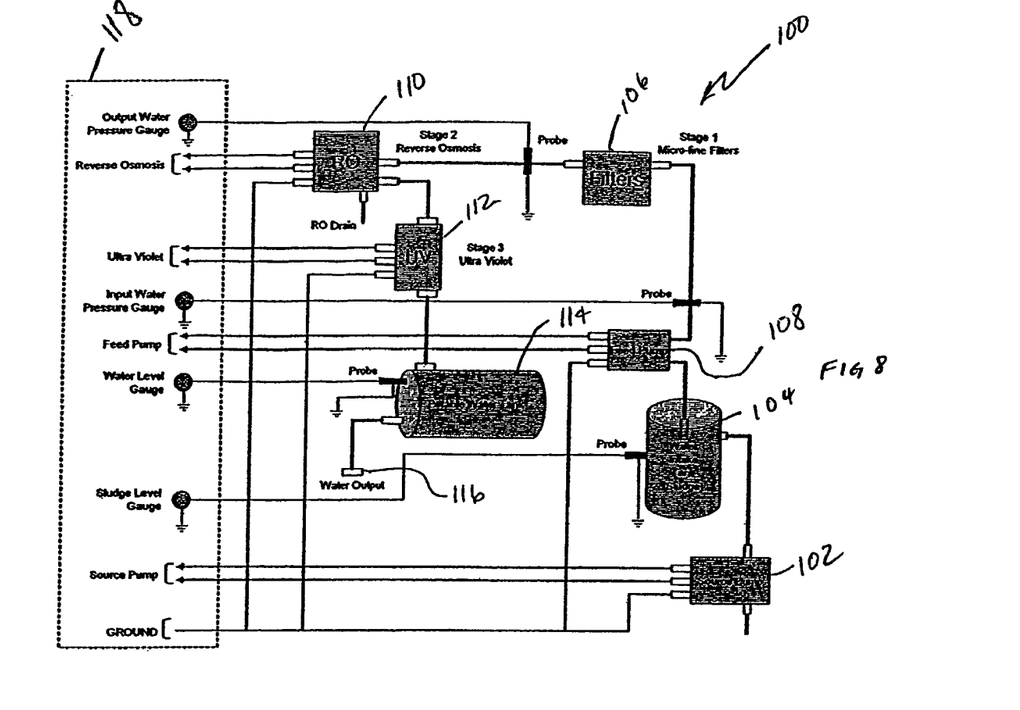
FIG. 8 is a schematic view of one embodiment of a water purification module of an integrated resource system.
Figure 11:
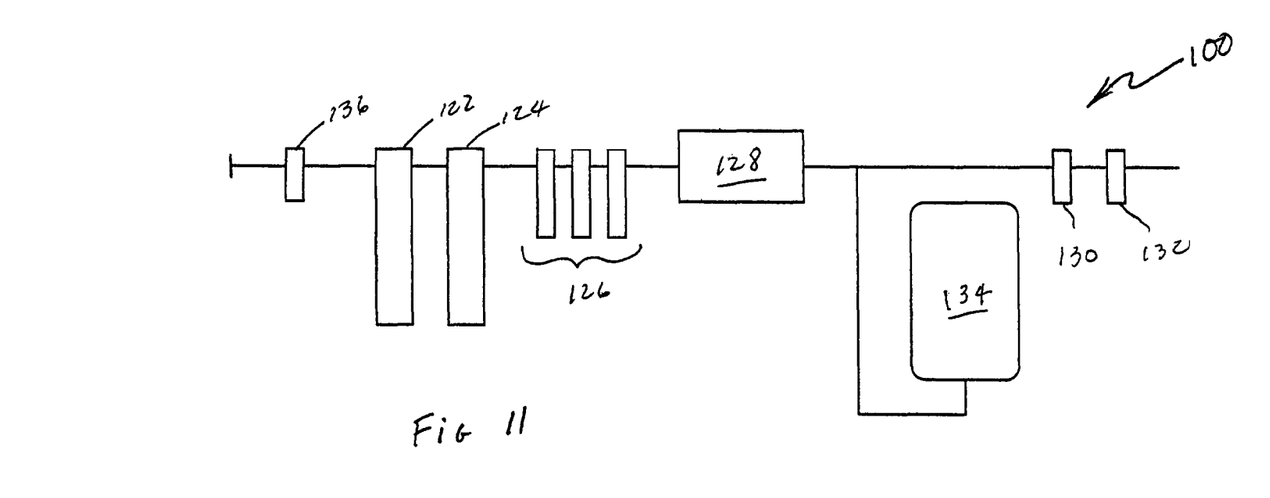
FIG. 11 is a schematic view of another embodiment of a water module for an integrated resource system; and, FIG. 12 is yet another embodiment of a water module for an IRS.
Figure 12:
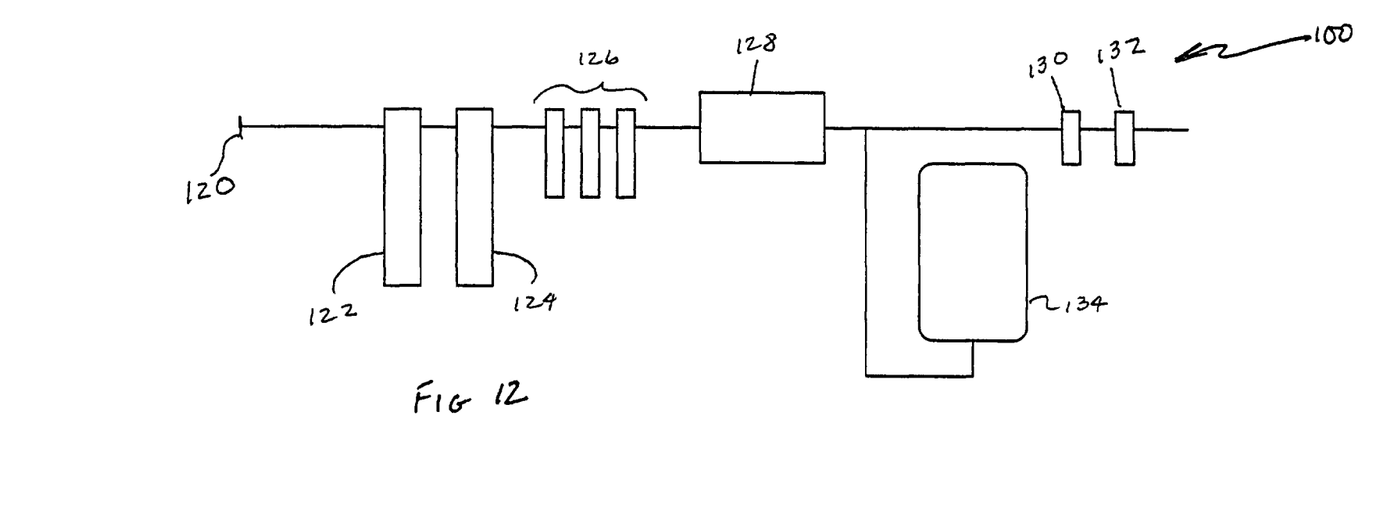

FIGS. 8, 11 and 12 illustrate schematically various embodiments of a water filtration module 100. A basic embodiment of a water filtration module 100 such as that illustrated in FIG. 8 includes a source pump 102 for pumping contaminated water from a source such as a tanker truck, stream, or lake. Source pump 102 pumps contaminated water into a water intake tank 104 or directly to a filter 106. Where a water intake tank 104 is included in the water filtration module 100, a feed pump 108 is provided to pump water from the tank 104 to the filter 106. Once filtered, water is pumped through a reverse osmosis filtration unit 110, an optional ultraviolet (UV) polisher 112 and then to a clean water storage tank 114 or directly to a water outlet 116. Ultraviolet light may be provided by standard bulbs or by light emitting diodes adapted to emit ultraviolet light.

Note that power and control connections to the power and control buses 30 and 40 are made at block 118. The water filtration module 100 is also provided with a plurality of sensors that provide information concerning the water level in tanks 104, 114, and regarding flow rates in the piping connecting various components.

In another embodiment, a pump (not shown) moves water through one or more flushable, reusable media filters on demand with no on-board storage capacity. Where purified water is needed even when there may be no immediate source of water, the water filtration module 100 may be provided with a storage tank and associate pump for storing unfiltered water. Alternatively, this storage tank may be placed adjacent the outlet of the water filtration module 100 for the storage of filtered water.

In the embodiment of the water filtration module 100 illustrated in FIG. 12, water enters the module through an intake 120. Water is then passed through a media filter and subsequently a water softener 124. The softened water is next passed through another particulate filter 126 having one or more filter elements and then to a reverse osmosis filtration unit 128. Once passed through the reverse osmosis filtration unit 128, the clean water may pass from the module 100 through a final media filter 130 and an ultraviolet light polisher 132. Water may be stored in tank 134 that is coupled to the piping 121. In an alternate embodiment illustrated in FIG. 11, a water purification additive dispenser 136 is inserted into piping 121 immediately after the intake 120. The water purification additive dispenser 136 injects an additive that kills bacteria and other pathogens present in the water. Examples of suitable additives include iodine, sodium hypochlorite, ozone and the like.

Similar to the water filtration module 100, an air module 140 may be provided to filter harmful air borne particulates and pathogens to make the air fit for use. A variety of purification and disinfecting media and mechanisms maybe adapted for use with the air module 140 to handle most emergencies. The control module 50 and air module 140 are in one embodiment adapted to communication information for control across the control bus 40. In this embodiment, the control module 50 may output general status information including warnings and notices relating to the useful life and operation of filter media and other components.

In one embodiment illustrated in FIG. 9, a blower 142 draws air into a duct 141 through inlet 142. Blower 142 drives this air through a filtration unit 144 that may use standard media filters, up to and including HEPA-type filters and/or reusable electrostatic-type filters. Sensors, such as sensor 146 may be provided to measure the pressure drop across the filtration unit 144 to monitor its performance and remaining useful life. Other sensors (not shown), such as an infrared absorption sensor, may be provided to monitor the level of particulate material present in the air passing through the duct 141. In addition to filtration, the air module 140 may also be provided with standard heating and air conditioning units that may include a heat exchanger 148 and associated compressor and/or heat pump 150. Note that condensate generated by the heat exchanger 148 when it is used as an air conditioning device, may be used by an associated water module 100. A humidifier 152 may accomplish humidification of the air passing through duct 141. Other air treatment mechanisms, such as an ultraviolet air treatment device 154 may also be incorporated into air module 140. Ultraviolet light may be provided by standard bulbs or by light emitting diodes adapted to emit ultraviolet light. Note that connections to the power and control buses 30 and 40 are made at block 143.

The embodiment of the air module 140 illustrated in FIG. 9 is particularly adapted for providing clean, breathable, and conditioned air for use within an enclosure or structure. Such enclosures may include a field hospital, housing unit, barracks, command and control center, a storage unit, or the like. In another embodiment of an air module 140, the air module will provide positive pressure for the interior of the enclosure to prevent the ingress of contaminated air from the exterior. In this manner, the air module 140 may be used in situations where there exist known, airborne pathogens, poisons, or irritants.

Figure 10:
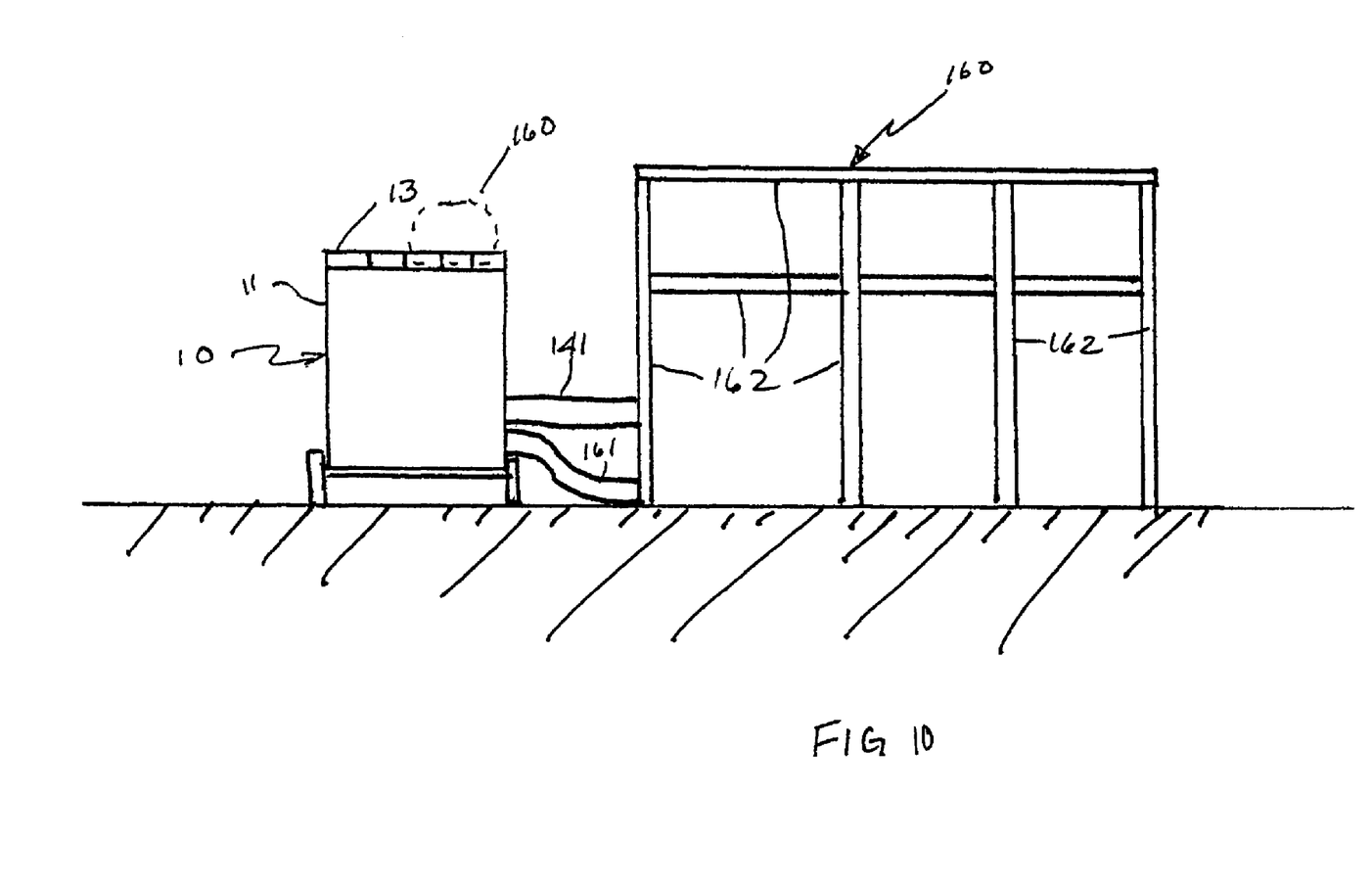
FIG. 10 is a front view of one embodiment of an integrated resource system adapted to raise a structure and to provide treated air for the interior thereof.

Another embodiment of the air module 150 is adapted for use as an inflation device for an inflatable structure 160 such as that illustrated in FIG. 10. This embodiment of air module 150 uses a blower to provide air through a conduit 161 at a high flow rate and at a relatively high pressure that is sufficient to inflate the structural members 162 of the inflatable structure 160. The structural members 162 are relatively air tight, but do experience some losses due to leaks. The flow rate of air coming from the blower of this embodiment of air module 150 is sufficient to cover for any incidental leaks in the structure 160. In one embodiment of the pallet 12, a rack 13 is provided on the top of a cover 11 of the pallet 12 to store a deflated and stowed structure 160. Structure 160 may be used as a command and control center, a hospital or clinic, a storage shed, or a habitation.

Figure 13:
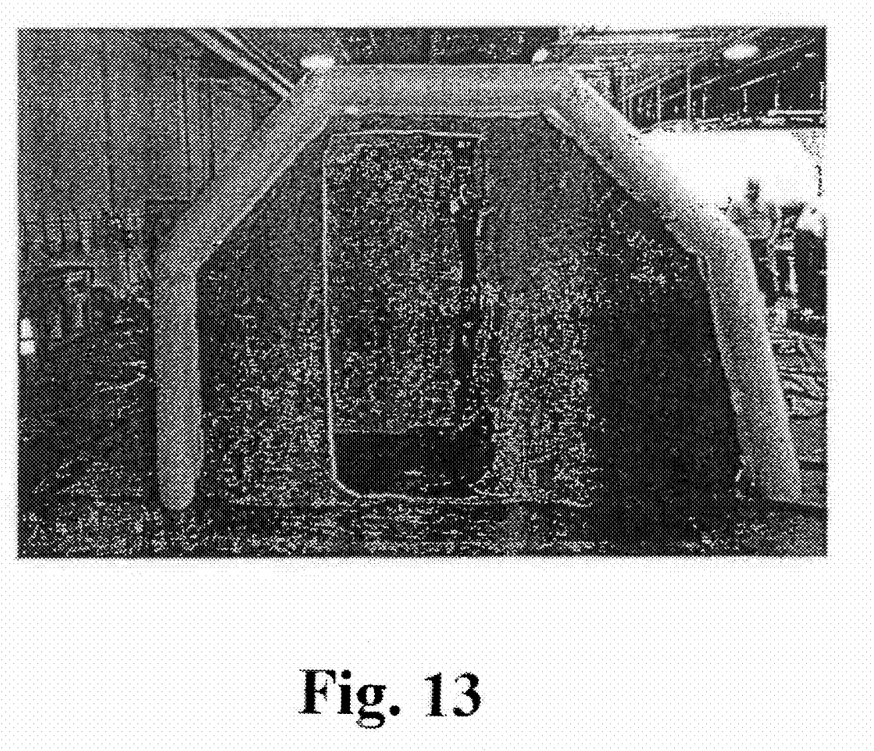
FIG. 13 is a view of an inflatable tent suitable for use as part of the invention.

For example, the structure can be a 20'×20' tent (33) such as the one depicted in FIG. 13. These tents are designed to provide an operations center and sleeping quarters for emergency staff or any other people requiring shelter. In one aspect of the invention, the tent can utilize inflatable tent technology, including the use of compressors and lightweight and durable materials that are safety/fire approved. In one alternative embodiment, ducting from the Environmental Control Module and electrical cable hookups can be built into each tent.

Figure 3:
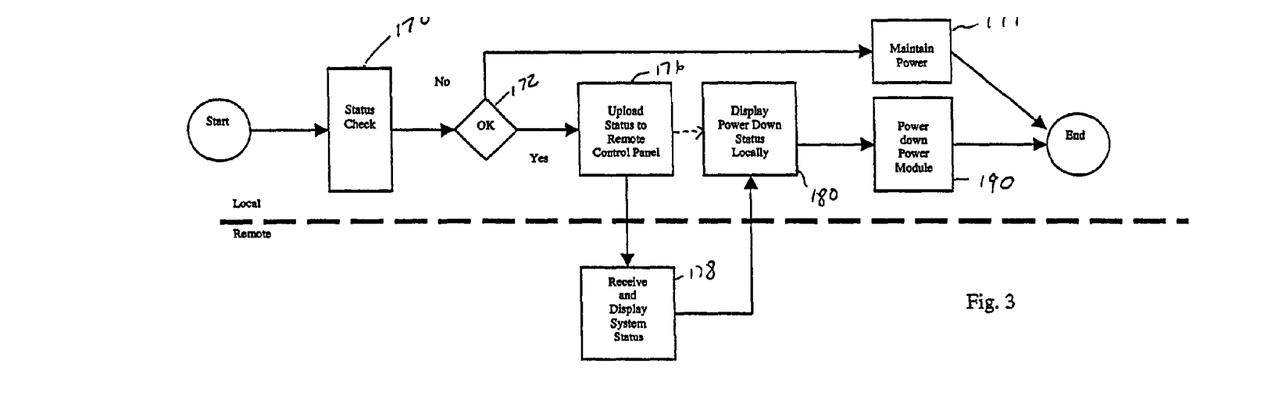
FIG. 3 is a diagram of one embodiment of a method of powering down a module of an integrated resource system.

FIG. 3 illustrates schematically a method whereby the integrated resource system may be operated to maintain power requirements for the modules of the integrated resource system or to keep a battery 88 or 94 charged. Upon start, a control module 50 queries the modules 20 of the integrated resource system 10 to determine if they are in need of electrical power. If any of the modules 20, and particularly any battery devices such as batteries 88 or 94, require electrical power, control module 50 keeps the power module 80 operating as shown at 174. The procedure then ends. However, where the query by the control module 50 indicates that all modules 20 are no longer in need of power, data relating to this status may be uploaded to the remote control panel 76 as indicated by box 176, which receives and displays integrated resource system status as indicated at 178. Once the power down status of the integrated resource system 10 has been displayed remotely, the power down status of the integrated resource system 10 is displayed locally as at 180 and the control panel 50 then takes steps to power down the modules 20 of the integrated resource system and particularly the power module 80, if any. Note that display of integrated resource system status may be displayed locally simultaneously with the upload of information to the remote control panel 76, though in some instances, it may be desirable for the actual powering down of the modules 20 of the integrated resource system to take place after confirmation of this procedure has been received from the remote control panel 76.

Figure 4:
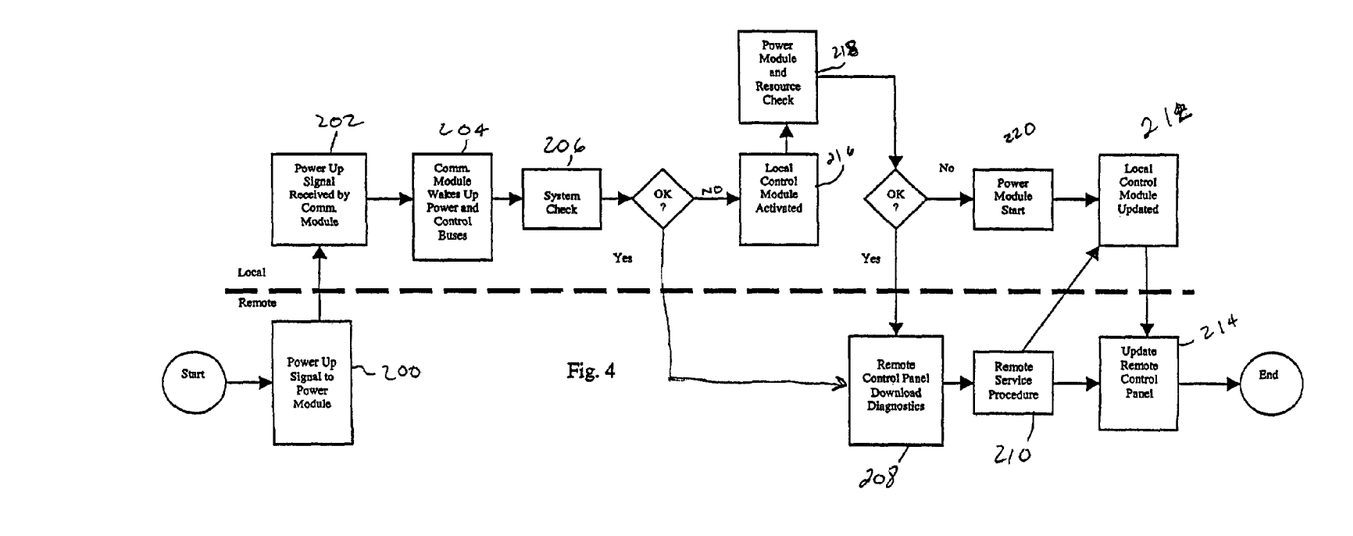
FIG. 4 is a diagram of one embodiment of a method of powering up a module of an integrated resource system.

Powering up an integrated resource system 10 that is dormant may be accomplished locally by simply actuating an on/off switch, button, or computer sequence. FIG. 4 illustrates a method whereby an embodiment of the integrated resource system 10 may be activated or powered up remotely. Upon start, a power up signal is sent by the remote control panel 76 as shown at 200 to a communication module 70 that receives the signal as shown at 202. The communications module 70 is woken by this signal and in turn sends a signal to the power and control buses 30 and 40 as shown at 204. The communications module 70 runs a system check to determine if there are any faults in the power and control buses 30 and 40 of the integrated resource system 10 as shown at 206. If the status of the power and control buses 30 and 40 are within specified parameters, then the remote control panel 76 will download data from the communications module 70 for diagnostic processing as at 208. The remote control panel 76 then runs a remote diagnostic procedure to determine if the integrated resource system 10 or any of its modules 20 needs service as at 210. The remote service procedure compares the data returned by the communications module 70 concerning the integrated resource system 10 with predetermined acceptable operational parameters to determine if maintenance or attention to the integrated resource system 10 is needed. The results of the remote diagnostic procedure are used to update the control module 50 status and the status of the integrated resource system 10 as indicated by the remote control panel 76 as shown at 212 and 214, respectively.

Where the status check made by the communications module 50 indicates that there was a fault in one or more of the power and control buses 30 and 40 of the integrated resource system 10, the control module 50 is activated as at 216. The control module 50 then carries out a local diagnostic procedure in which the control module queries the modules 20 of the integrated resource system 10, including the power module 80, to determine if there is a fault in the system as shown at 218. If this diagnostic procedure indicates that the status of the integrated resource system 10 is faulty in some manner, data is communicated to the remote control panel 76 for diagnostic analysis as at 208. Where the status of the integrated resource system 10 is acceptable, other modules such as the power module 80 are started as at 220. Upon startup, the control panel 50 and remote control panel 76 are updated to reflect the newest status of the integrated resource system 10 as shown at 212 and 214, respectively.

Figure 5:
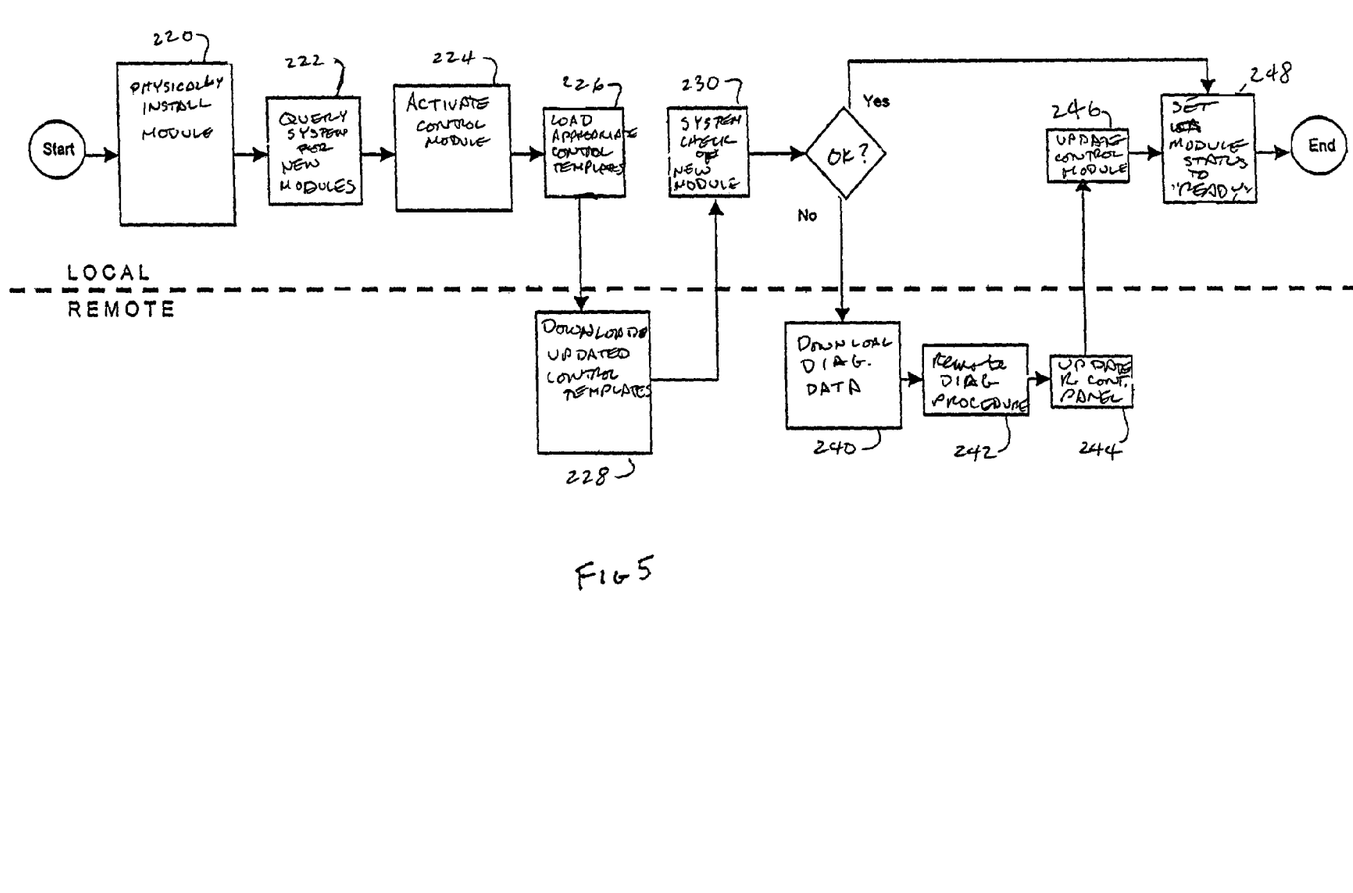
FIG. 5 is a diagram of one embodiment of a method of coupling a module to an integrated resource system.

FIG. 5 schematically illustrates one embodiment for initializing a module 20 such as a water filtration module 100 upon installation in an integrated resource system 10. The method of FIG. 5 begins with the integrated resource system 10 in a powered down or dormant mode. After physically installing a water filtration module 100 as at 220, a query by the communications module 100 or control modules 50 identifies the presence and identity of the new water filtration module 100 as shown at 222. Note that the query by the communications and/or control module may be a periodic query performed automatically by these modules or may be activated in some manner by the installation of the new module 20. Where the query identifies the presence of a new module 20, the control module 50 is activated as at 224 and the appropriate control templates or drivers for the new module 20 are loaded from the memory device 54 as at 226. At this time, the control panel 50, through the communications module 70 downloads any updated control templates or drivers that may be present on the remote control panel 76 as at 228 and a local system check that includes the new module is undertaken as at 230. If the integrated resource system 10 and its new module are functional within specified parameters, status of the new module 20 is set to a "ready" status and may be used when needed.

Where the integrated resource system 10 and particularly the new module, are not within the specified operational parameters, data relating to the operation of the integrated resource system 10 and the new module 20 is uploaded to the remote control panel 76 as at 240 and a remote diagnostic analysis is performed as at 242. Once the remote diagnostic analysis is complete, the results of the analysis are used to update the status on the remote control panel 76, as at 244, and to update the control module 50, as at 246. Once the control panel 50 has been updated, the status of the new module 20 will be set to "ready" where the new module, such as a water filtration module 100, is in fact ready for operation. However, where the new module 20 remains outside of specified operating parameters, the control module 50 and the remote control panel 76 will note this status and the new module will be indicated as able to operate at reduced efficiency or not at all, as the case may be. In this instance, the control module 50 and remote control panel 76 will indicate that maintenance is needed.

Figure 6:
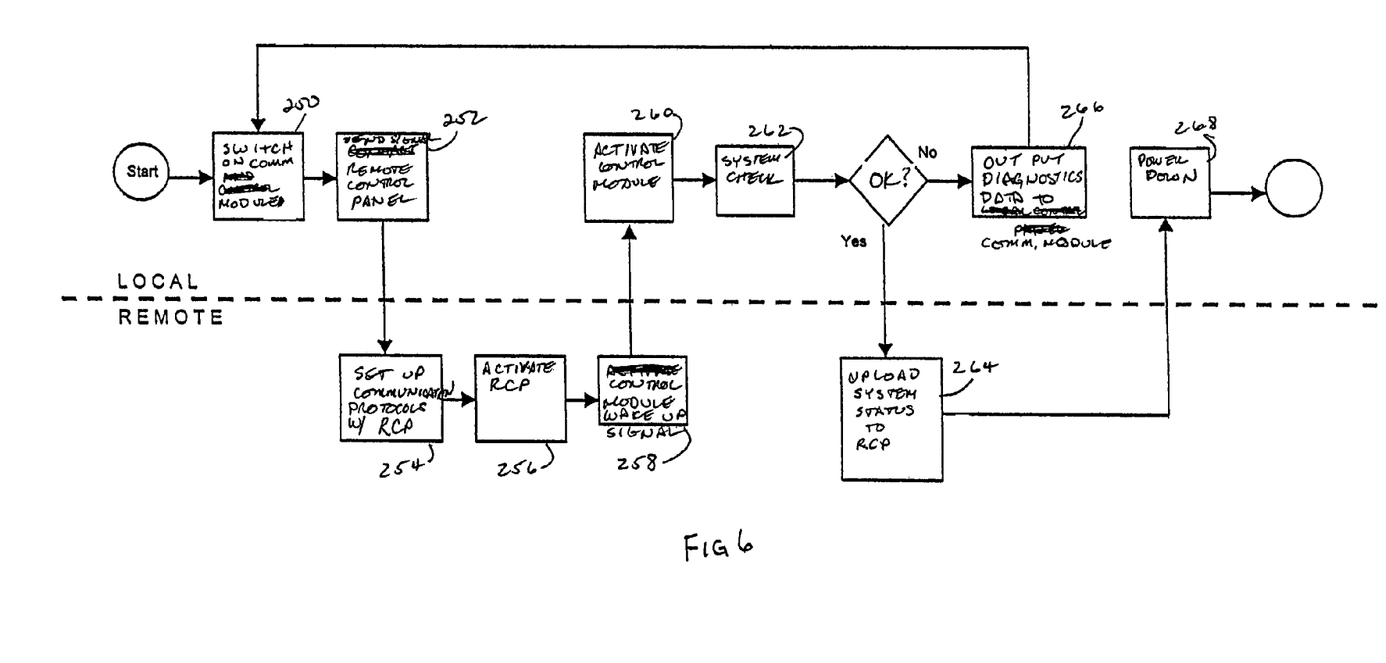
FIG. 6 is a diagram of one embodiment of a method of initializing an integrated resource system.

FIG. 6 illustrates one embodiment of a method for the startup of an integrated resource system 10. Upon start, the communications module 100 is started as at 250. The communications module 100 sends a signal to the remote control panel 76 as at 252 and a communication protocol is negotiated between the communications module 100 and the remote control panel 76 as at 254. Once communications have been established, the remote control patent 76 is fully activated as at 256 and a wake up signal is sent to the control module 50 via the communications module 100 as at 258. Once activation of the control module 50 has been achieved as at 260, the control module 50 performs a systems check as at 262. Where the system check indicates that the integrated resource system 10 is not operating within specified parameters, diagnostic information is sent from the control panel 50 to the communications module 100 as at 266 so that the communications module 100 may connect to the remote control panel 76 once again as at 250. Where the integrated resource system 10 is operating within specified operational parameters, system status data is uploaded to the remote control panel 76 as at 264. Once updated, the remote control panel 76 powers down the integrated resource system 10, as at 268, using a procedure such as that illustrated in FIG. 3.

It is to be understood that many different types of modules 20 may be adapted and used with an integrated resource system 10 of the present invention. For example, modules 20 having air compressors or hydraulic pumps for operating pneumatic or hydraulic equipment may be provided. In addition, multiple modules 20 having the same functionality may be incorporated into a integrated resource system 10 such as where an integrated resource system is intended primarily for a single use, i.e. two or more power modules 80 or water filtration modules 100 may be integrated into a single integrated resource system 10.

Another module 20 that may be incorporated into the integrated resource system 10 is a security module that includes sensors, alarms, and tracking devices to improve the security of the integrated resource system 10. Motion sensors and infrared sensors may be included to provide area security while passwords and disarming procedures prevent unauthorized access to the integrated resource system 10. A sensor module may also include ground positioning systems or the like to pinpoint the location of the integrated resource system 10, should it go missing or be stolen.

CONCLUSION

Although specific embodiments of an integrated resource system have been illustrated and described herein, it is manifestly intended that this invention be limited only by the following claims and equivalents thereof.

What is claimed is:

1. A modular infrastructure services device comprising:
a wheeled vehicle with a mounting structure for mounting a plurality of infrastructure modules thereon; the wheeled vehicle having an enclosure for providing protection to infrastructure modules mounted thereon; and
a power bus having a plurality of modular power couplings for electrically connecting the plurality of infrastructure modules thereto;
a plurality of infrastructure modules mounted to the wheeled vehicle and coupled to the power bus, the plurality of infrastructure modules comprising a communications module, an electric power generation module, a water filtration module, and an environmental control module, for providing infrastructure services from the wheeled vehicle comprising electric power, filtered water and conditioned air; and
the infrastructure services device further comprising an inflatable tent structure, the wheeled vehicle having a carrier or rack thereon for storing the deflated and stowed tent structure, wherein the tent structure is erectable in proximity to the wheeled vehicle and comprising ducting such that when the tent structure is erected it is connected by the ducting to the wheeled vehicle.

2. The modular infrastructure services device of claim 1 further comprising a control module and a control bus having at least one modular control coupling for communicatively coupling a plurality of infrastructure modules thereto, and wherein the power and control buses comprise couplings for connecting at least one other power and control bus thereto, respectively.

3. The modular infrastructure services device of claim 1 wherein the power bus comprises a power coupling for connecting an auxiliary power source thereto, the power coupling further comprising a switch for controlling the flow of electric power through the power coupling.

4. The modular infrastructure services device of claim 3 wherein the switch comprises a switchgear.

5. The modular infrastructure services device of claim 3 wherein the control bus is coupled to the switch.

6. The modular infrastructure services device of claim 2 wherein a communications module mounted on the pallet wheeled vehicle and coupled to the power and control buses receives signals from a remote control panel and transmits the signals to a control module also mounted on the pallet wheeled vehicle and coupled to the power and control buses, the signals from the remote control panel comprising control signals that operate the control module in a desired manner.

7. The modular infrastructure services device of claim 1 wherein the control module is adapted to relay signals from the plurality of other infrastructure modules, through the communications module to the remote control panel.

8. The modular infrastructure services device of claim 7 wherein the communication between the remote control panel and the control module is two-way.

9. The modular infrastructure services device of claim 1, and further comprising:
a control module having a central processing unit coupled to a read/write memory device, an input/output device, a power supply and to a communications port;
a control bus comprising a conductor for control signals and at least one control coupling;
wherein the power bus is coupled to the power supply of the control module and wherein the
control bus is coupled to the communications port of the control module.

10. The infrastructure services device of claim 9 further comprising a communications module having at least one two-way communications device, the communications module being coupled to the power bus and to the control bus and being further adapted to send and receive signals over the control bus to and from the control module.

11. The infrastructure services device of claim 10 wherein the two way communications device of the communications module is chosen from a group consisting of a satellite communications system, a non-directional broadcast transceiver, a line-of-sight communications system, a cellular communications system, a two way paging system, and a wireless broadband communications system.

12. The infrastructure services device of claim 9 wherein it is controlled by signals received over the control bus from the control module.

13. The infrastructure services device of claim 12 wherein the electric power generation module comprises a motor driven generator set and a battery.

14. The infrastructure services device of claim 12 wherein the water filtration module comprises:
a media filter;
a reverse osmosis filtration unit; and
an ultraviolet light water treatment unit,
the media filter being adapted to receive and filter contaminated water, the reverse osmosis filtration unit being coupled to the media filter so as to received the filtered water therefrom, the reverse osmosis filtration unit passing the water therethrough and to the ultraviolet light water treatment unit, which is coupled to the reverse osmosis filtration unit.

15. The infrastructure services device of claim 14 further comprising a water softener coupled to the media filter downstream therefrom.

16. The infrastructure services device of claim 14 further comprising a water treatment additive dispenser adapted to inject a water treatment additive to the water flowing therethrough, the water treatment additive dispenser being coupled to the media filter in a position upstream therefrom.

17. The infrastructure services device of claim 9 further comprising a water filtration module comprising:
a conduit for the passage of water therethrough having an inlet and outlet;
a pre-filter coupled inline with the conduit downstream of the inlet;
a water softener coupled inline with the conduit downstream of the pre-filter;
a reverse osmosis filter coupled inline with the conduit downstream of the water softener; and,
a storage tank coupled to the conduit between the outlet of the conduit and the reverse osmosis filter.

18. The infrastructure services device of claim 17 wherein the water filtration module further comprises a post-filter coupled inline with the conduit downstream from the storage tank and an ultraviolet light water treatment device coupled in line with the conduit between the post filter and the outlet of the conduit.

19. The infrastructure services device of claim 1, further comprising:
a communications module having a two-way communications device adapted to send and receive information to and from a remote control panel;
the communications module being coupled to both the power bus and to a control bus, the communications module being further adapted to receive operational information regarding the plurality of infrastructure modules and to relay that operational information to the remote control panel and to receive control signals from the remote control panel and to distribute those control signals to the plurality of infrastructure modules via the control bus.

20. The infrastructure services device of claim 19 wherein the power generation module coupled to the power bus and adapted to provide electrical power to the plurality of infrastructure modules coupled to the power bus, the power module also being coupled to the control bus and being adapted to receive and act upon control signals received over the control bus.

21. The infrastructure services device of claim 19 further comprising a local control module coupled to the power and control buses, the local control module being adapted to control the plurality of infrastructure devices.

22. The infrastructure services device of claim 19 wherein the water filtration module comprises at least one filter and a water softening mechanism, the water filtration module being coupled to the power and control buses.

23. The infrastructure services device of claim 22 wherein the water filtration module further comprises a water treatment additive dispenser.

24. The infrastructure services device of claim 19 further comprising an environmental control module having at least one air filter positioned to filter air form the at least one air blower.

25. The infrastructure services device of claim 24 wherein the environmental control module further comprises a heat exchanger positioned downstream of the at least one filter.

26. The infrastructure services device of claim 24 wherein the environmental control module further comprises an ultraviolet light air treatment device positioned to shine ultraviolet light on air received from the at least one air filter.

27. The infrastructure services device of claim 25 wherein the environmental control module further comprises a humidifier positioned to inject moisture into air received from the heat exchanger.

28. The infrastructure services device of claim 1, wherein the water filtration module comprises:
   a conduit for the passage therethrough having an inlet and an outlet;
   a pre-filter coupled inline with the conduit downstream of the inlet;
   a water softener coupled inline with the conduit downstream of the pre-filter; and,
   a reverse osmosis filter coupled inline with the conduit downstream of the water softener.

29. The infrastructure services device of claim 28 further comprising a storage tank coupled to the conduit between the outlet of the conduit and the reverse osmosis filter.

30. The infrastructure services device of claim 29 wherein the water filtration module further comprises a post-filter coupled inline with the conduit downstream from the storage tank and an ultraviolet light water treatment device coupled in line with the conduit between the post filter and the outlet of the conduit.

31. The infrastructure services device of claim 28 further comprising a water treatment additive dispenser coupled inline with the conduit upstream from the pre-filter.

32. The infrastructure services device of claim 28 wherein the water treatment additive dispenser is adapted to dispense into the water flowing through the conduit an additive chosen from a group consisting of iodine, sodium hypochlorite, and ozone.

33. A modular infrastructure services device comprising:
   a trailer comprising an enclosure;
   a plurality of infrastructure modules mounted to the trailer within the enclosure and coupled to a power bus and a control bus, the plurality of infrastructure modules comprising, an electric power generator, a water filtration module, and an environmental control module for providing infrastructure services from the wheeled vehicle comprising electric power, filtered water and conditioned air; and
   the modular infrastructure services device further comprising an erectable tent structure, the trailer having a carrier or rack thereon for stowing the tent structure when not erected, wherein the tent structure is erectable adjacent to the trailer and the services device further comprising a duct which is connectable between the trailer and tent when erected for providing conditioned air to the tent from the services device.

34. A modular infrastructure services device comprising:
   a wheeled vehicle comprising an enclosure;
   a plurality of infrastructure modules mounted to the wheeled vehicle within the enclosure for protecting the infrastructure modules and coupled to at least one of a power bus and a control bus, the plurality of infrastructure modules comprising: an electric power generator, a water filtration module, and an environmental control module whereby the wheeled vehicle provides infrastructure externally of the wheeled vehicle comprising electric power, filtered water and conditioned air, respectively;
   the modular infrastructure services device further comprising an erectable tent structure, the tent structure stowable on a rack or carrier of the wheeled vehicle when not erected and erectable apart from the wheeled vehicle, and the services device further comprising a duct such that when the tent is erected it is connected by the duct to the wheeled vehicle.

* * * * *